(12) United States Patent
Hirooka et al.

(10) Patent No.: US 11,090,836 B2
(45) Date of Patent: Aug. 17, 2021

(54) SAMPLING APPARATUS, SHEET MEMBER MANUFACTURING APPARATUS, AND GYPSUM BUILDING MATERIAL MANUFACTURING APPARATUS

(71) Applicant: YOSHINO GYPSUM CO., LTD., Tokyo (JP)

(72) Inventors: Yuichi Hirooka, Tokyo (JP); Takahide Yamasato, Tokyo (JP); Kenichi Hashikura, Tokyo (JP); Hiroyuki Someno, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 106 days.

(21) Appl. No.: 16/604,263

(22) PCT Filed: Apr. 11, 2018

(86) PCT No.: PCT/JP2018/015279
§ 371 (c)(1),
(2) Date: Oct. 10, 2019

(87) PCT Pub. No.: WO2018/193942
PCT Pub. Date: Oct. 25, 2018

(65) Prior Publication Data
US 2020/0147834 A1    May 14, 2020

(30) Foreign Application Priority Data

Apr. 17, 2017 (JP) .............................. JP2017-081565

(51) Int. Cl.
*B28B 17/00* (2006.01)
*B28B 13/00* (2006.01)
(Continued)

(52) U.S. Cl.
CPC .......... *B28B 17/0018* (2013.01); *B28B 11/14* (2013.01); *B28B 13/04* (2013.01);
(Continued)

(58) Field of Classification Search
CPC ......... B28B 11/14; B28B 13/00; B28B 13/04; B28B 17/00; B28B 17/0018; B65G 47/29;
(Continued)

(56) References Cited

U.S. PATENT DOCUMENTS 3,887,066 A * 6/1975 Houtsager ............ B65G 47/252
198/403
4,220,239 A * 9/1980 Prichard, Jr. .......... B65H 29/00
198/403
(Continued)

FOREIGN PATENT DOCUMENTS

CN    204882123 U    12/2015
JP    H02-046276     10/1990
(Continued)

OTHER PUBLICATIONS

Extended European search report for European Patent Application No. 18787115.7 dated Feb. 28, 2020.
(Continued)

*Primary Examiner* — Nguyen Q. Ha
(74) *Attorney, Agent, or Firm* — Ipusa, PLLC

(57) ABSTRACT

A sampling apparatus is provided, which includes a pressing-up unit configured to press up a sheet piece that is being conveyed by a conveying unit, from a lower side of a conveyance course of the sheet piece to above the conveyance course; and
a holding unit configured to hold the sheet piece pressed up by the pressing-up unit.

9 Claims, 8 Drawing Sheets

(51) Int. Cl.
  *B28B 11/14* (2006.01)
  *B28B 13/04* (2006.01)
  *B65G 47/29* (2006.01)
  *B65G 47/34* (2006.01)
  *B65G 47/82* (2006.01)
  *B65G 47/90* (2006.01)
  *G01N 1/04* (2006.01)

(52) U.S. Cl.
  CPC ............. *B65G 47/29* (2013.01); *B65G 47/34* (2013.01); *B65G 47/82* (2013.01); *B65G 47/901* (2013.01); *G01N 1/04* (2013.01)

(58) Field of Classification Search
  CPC ...... B65G 47/34; B65G 47/82; B65G 47/901; G01N 1/04
  See application file for complete search history.

(56) References Cited

U.S. PATENT DOCUMENTS

| | | | | |
|---|---|---|---|---|
| 5,665,197 | A | * | 9/1997 | Fujii ................. B27D 1/04 156/558 |
| 6,557,692 | B2 | * | 5/2003 | Runonen ............ B65G 47/248 198/403 |

FOREIGN PATENT DOCUMENTS

| | | |
|---|---|---|
| JP | H05-277359 | 10/1993 |
| JP | H10-146812 | 6/1998 |
| JP | 2006-272819 | 10/2006 |

OTHER PUBLICATIONS

International Search Report for PCT/JP2018/015279 dated Jul. 10, 2018.

* cited by examiner

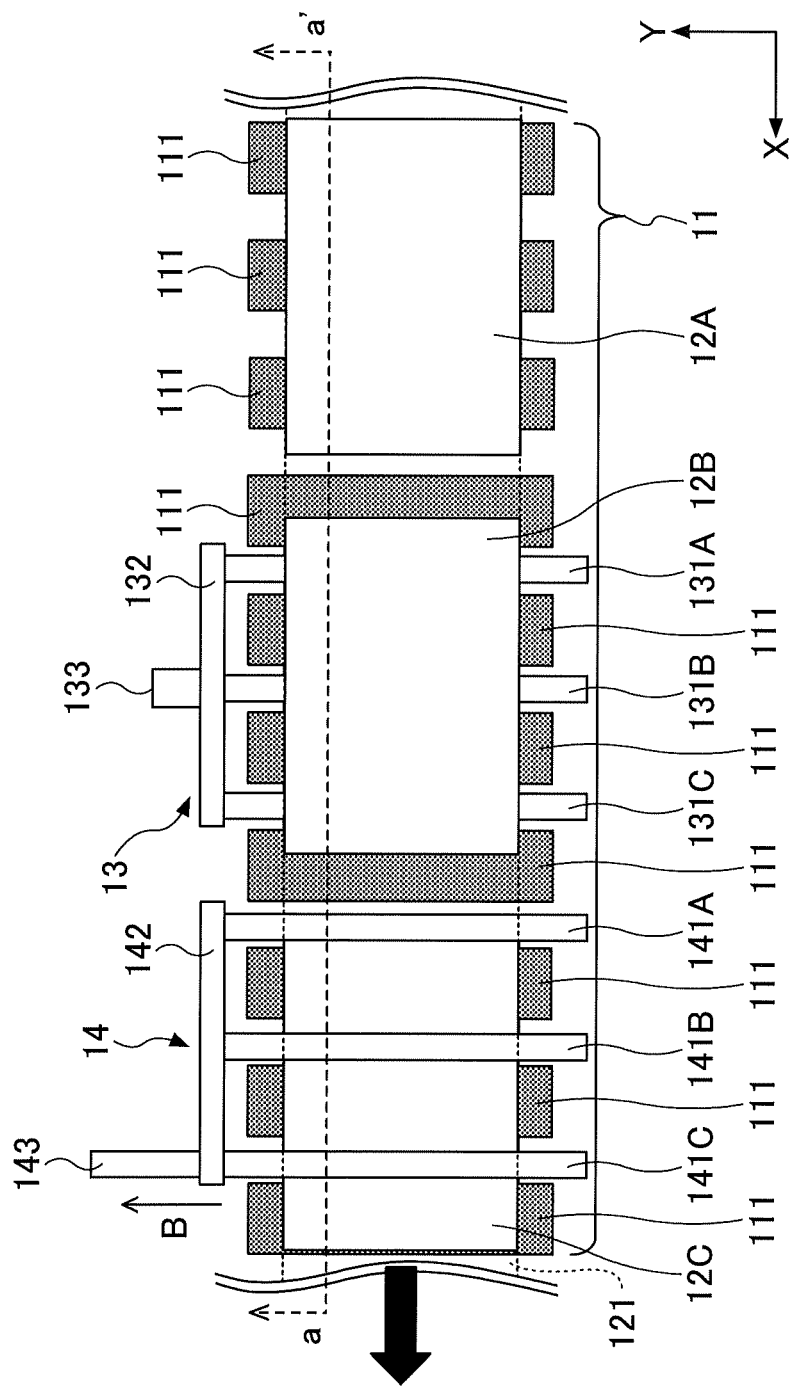

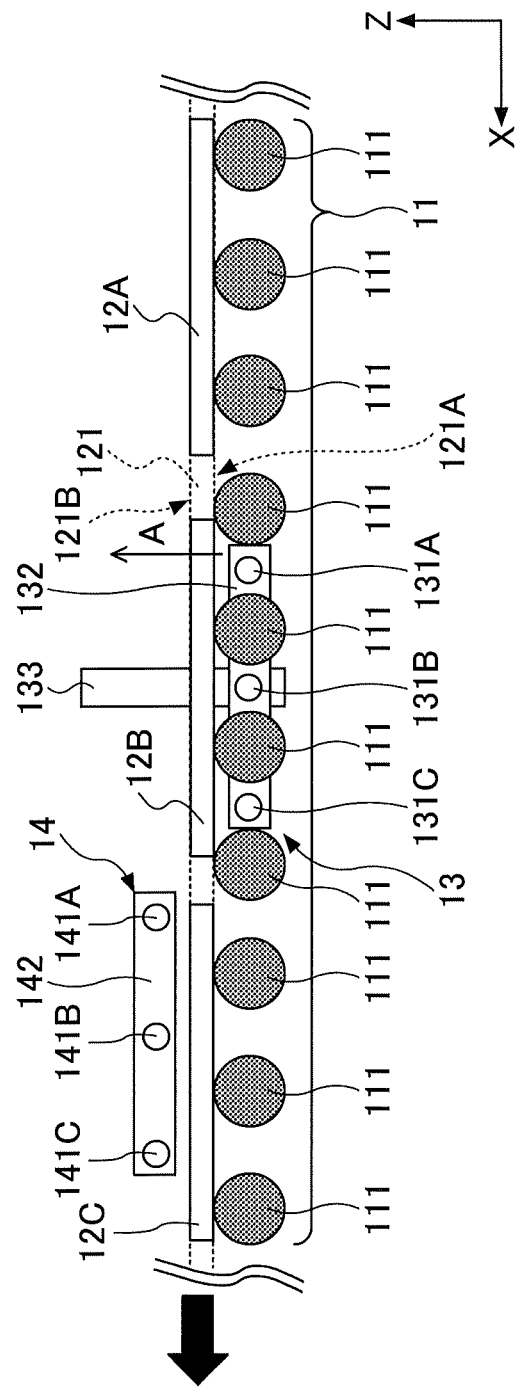

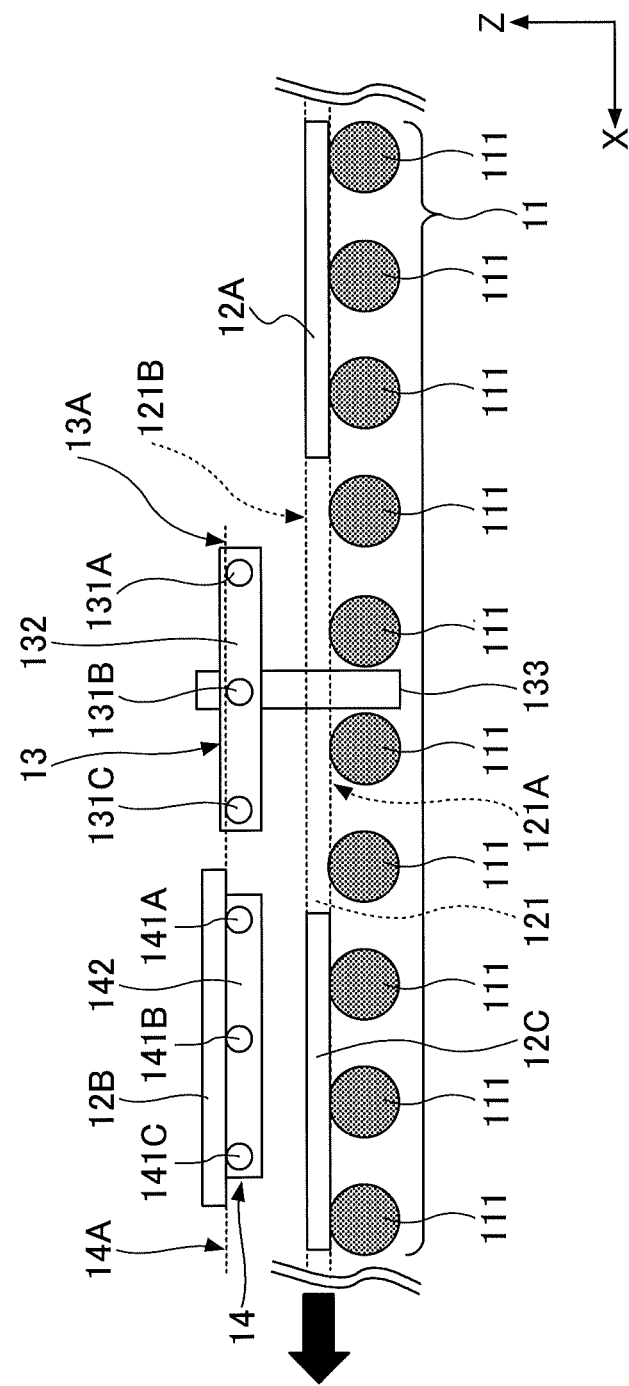

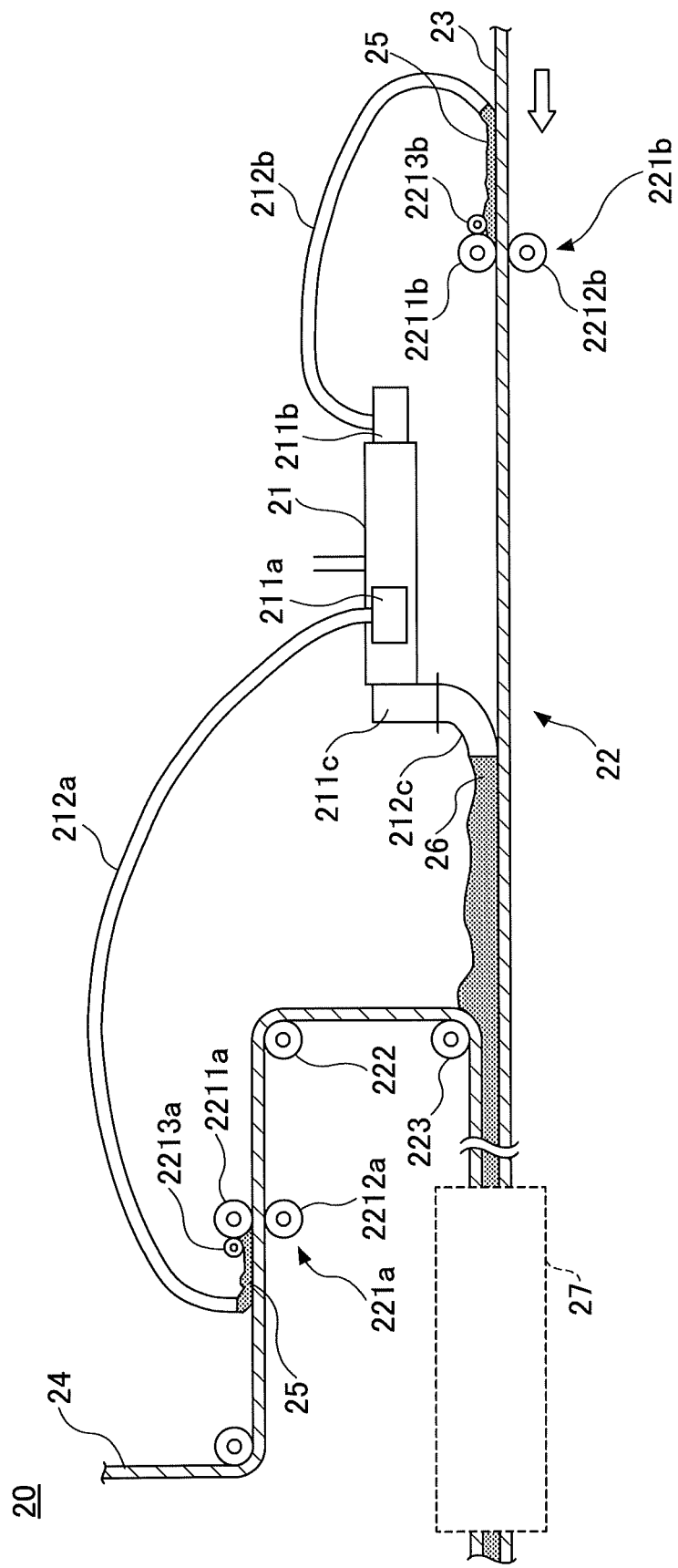

SAMPLING APPARATUS, SHEET MEMBER MANUFACTURING APPARATUS, AND GYPSUM BUILDING MATERIAL MANUFACTURING APPARATUS

TECHNICAL FIELD

The present invention relates to a sampling apparatus, a sheet member manufacturing apparatus, and a gypsum building material manufacturing apparatus.

BACKGROUND ART

A sheet-shaped product that includes, as a raw material, an inorganic material such as a ceramic or a metal, or an organic polymer material such as a resin is continuously manufactured. In this regard, for example, after the raw material is shaped to have a strip-like continuous shape, the thus-shaped product is conveyed while various processes such as a cutting process, a drying process, and so forth are carried out on the product if necessary.

A worker or the like samples a semifinished product or a part of a finished product being conveyed at a random or predetermined timing. The sampled product is used to evaluate as to whether semifinished products or the like have been manufactured according to a standard. By thus sampling and evaluating a semifinished product or the like in a manufacturing process, it is possible to rapidly determine that a problem, if any, occurs in the manufacturing process, and to avoid a defect of a product.

SUMMARY OF THE INVENTION

Problems to be Solved by the Invention

However, normally the above-mentioned semifinished products or the like are continuously conveyed. Therefore, a skill may be required to manually sample a semifinished product or the like depending on a conveyance speed, a size or a weight of the product, and so forth.

In consideration of the above-mentioned problem of the conventional technology, an object of an aspect of the present invention is to provide a sampling apparatus with which it is possible to easily sample a sheet piece that is being conveyed.

Means for Solving the Problems

In order to achieve the above-mentioned object, according to the aspect of the present invention, a sampling apparatus is provided, which includes a pressing-up unit configured to press up a sheet piece that is being conveyed by a conveying unit, from a lower side of a conveyance course of the sheet piece to above the conveyance course; and a holding unit configured to hold the sheet piece pressed up by the pressing-up unit.

Advantage of the Invention

According to the aspect of the present invention, it is possible to provide a sampling apparatus with which it is possible to easily sample a sheet piece that is being conveyed.

BRIEF DESCRIPTION OF THE DRAWINGS

FIG. 1A illustrates a sampling apparatus according to a mode for carrying out the invention.

FIG. 1B illustrates the sampling apparatus according to the mode for carrying out the invention.

FIG. 1C illustrates the sampling apparatus according to the mode for carrying out the invention.

FIG. 2 illustrates a sheet member manufacturing apparatus according to the mode for carrying out the invention;

DETAILED DESCRIPTION OF THE EMBODIMENTS

Figure 3A:
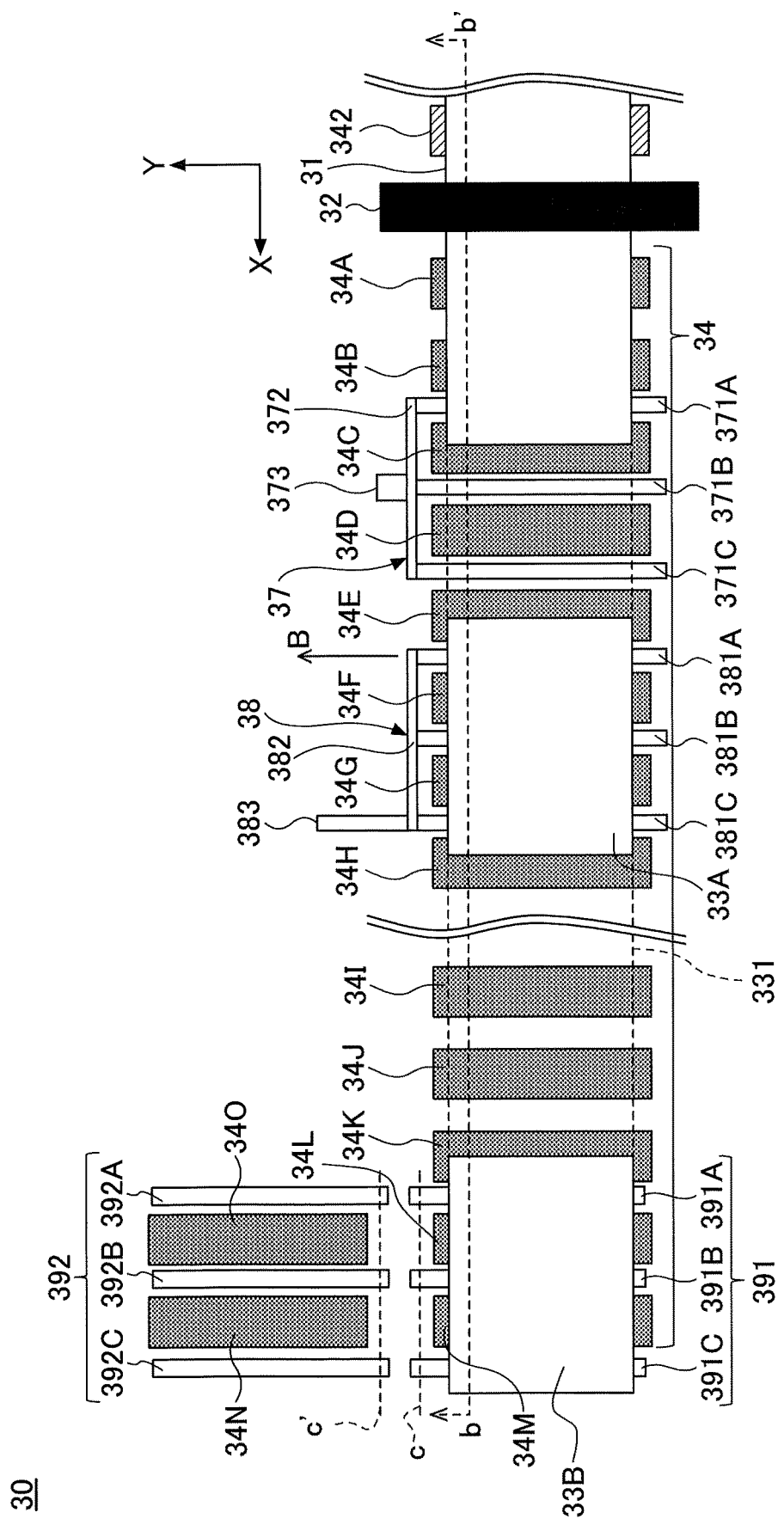
FIG. 3A illustrates a downstream-side apparatus according to a first embodiment of the present invention.

A mode for carrying out the invention will now be described with reference to drawings. In this regard, the present invention is not limited to the below-mentioned embodiments; it is possible to variously make change and replacement to the below-mentioned embodiments without departing from the scope of the present invention.

[Sampling Apparatus]

One example of a sampling apparatus according to a mode for carrying out the invention will now be described.

A sampling apparatus according to the mode for carrying out the invention may include a pressing-up unit configured to press up a sheet piece that is being conveyed by a conveying unit, from a lower side of a conveyance course of sheet piece to above the conveyance course; and a holding unit configured to hold the sheet piece pressed up by the pressing-up unit.

Below, with reference to FIGS. 1A-1C, one example of a sampling apparatus according to a mode for carrying out the invention will be described.

FIG. 1A is a plan view of the sampling apparatus according to the mode for carrying out the invention; FIG. 1B is a sectional view of the sampling apparatus taken along an a-a' line of FIG. 1A; and FIG. 1C is a sectional view of the sampling apparatus taken along an a-a' line of FIG. 1A after a pressing-up unit 13 presses up a sheet piece 12B, that is, after a sampling process is carried out, as will be described.

FIGS. 1A-1C illustrate a state where a conveying unit 11 conveys sheet pieces 12A-12C that are sheet objects to be conveyed in a direction indicated by a block arrow, i.e., leftward along the X-axis directions. In the example of FIGS. 1A-1C, a sheet piece 12B to be sampled from among the sheet pieces 12A-12C that are being conveyed is sampled. The X-axis directions in FIGS. 1A-1C that are leftward and rightward directions are conveyance directions along which the sheet pieces 12A-12C are conveyed. That is, the conveyance directions correspond to the longitudinal directions of the sheet pieces 12A-12C. The Y-axis directions correspond to the width directions of the sheet pieces 12A-12C. The X-axis directions and the Y-axis directions are horizontal directions. The Z-axis directions are height directions, i.e., vertical directions. The Z-axis directions correspond to the thickness directions of the sheet pieces 12A-12C.

In FIGS. 1A-1C, the same reference numerals are given to the same members, and description duplicate among FIGS. 1A-1C will be partially omitted.

Various members illustrated in FIGS. 1A-1C will now be described.

As described above, manually sampling the sheet piece 12B that is a semifinished sheet-shaped product or a finished sheet-shaped product being conveyed may require a skill, and has been difficult. There may be a method where, upon sampling, conveyance of the sheet pieces 12A-12C including the sheet piece 12B by the conveying unit 11 is stopped. However, according to such a method, manufacturing semifinished sheet-shaped products or finished sheet-shaped products is also required to be stopped. Therefore, such a method is undesirable from a productivity viewpoint. The inventors of the present invention and so forth have diligently investigated a sampling apparatus with which a sheet piece that is being conveyed can be easily sampled without manufacturing of semifinished sheet-shaped products or finished sheet-shaped products being stopped.

As a result, the inventors and so forth have found that a sheet piece that is being conveyed can be easily sampled with a sampling apparatus that includes a pressing-up unit 13 configured to press up a sheet piece 12B that is being conveyed by a conveying unit 11, from a lower side of a conveyance course 121 of the sheet piece 12B to above the conveyance course 121; and a holding unit 14 configured to hold the sheet piece 12B pressed up by the pressing-up unit 13. Thus, the present invention has been completed.

Various members illustrated in FIGS. 1A-1C will now be described.

The conveying unit 11 conveys the sheet pieces 12A-12C, i.e., semifinished sheet-shaped products or finished sheet-shaped products, and is not particularly limited as long as the pressing-up unit 13 can be installed together. The conveying unit 11 may be a unit to convey the sheet pieces 12A-12C horizontally. The conveying unit 11 is not particularly limited and may be configured in such a manner that the pressing-up unit 13 can be prevented from interfering with a movable part of the conveying unit 11, i.e., a part that is driven for conveying a sheet piece, when the pressing-up unit 13 operates. However, the conveying unit 11 is not limited to such a configuration. As the conveying unit 11, for example, a roller conveyer or a chain conveyer may be used. A roller conveyer may be preferably used as the conveying unit.

A chain conveyer is a conveyer where at least two rows of chains are wound around a plurality of rollers, the chains are rotated as a result of the rollers being turned, and the chains covey sheet pieces.

A roller conveyer is a conveyer where, as illustrated in FIGS. 1A-1C, a plurality of rollers 111 are arranged, the rollers 111 support sheet pieces, and the rollers 111 convey the sheet pieces as a result of being turned.

A configuration of the conveying unit 11 may be different between a part where the pressing-up unit 13 is installed and the other parts. For example, in the conveying unit 11, a roller conveyer may be used only at a position where the pressing-up unit 13 is installed, and belt conveyers may be used at positions on the upstream side and the downstream side of the roller conveyer.

The sheet pieces 12A-12C are not particularly limited as long as they have sheet shapes. As the sheet pieces 12A-12C, semifinished sheet-shaped products or finished sheet-shaped products that include, as a raw material, an inorganic material such as a ceramic or a metal, or an organic polymer material such as a resin may be cited for example. More specifically, a gypsum building material that will be described later or the like may be cited for example.

Sizes and so forth of the sheet pieces 12A-12C are also not particularly limited. In the example of FIGS. 1A-1C, the sheet pieces 12A-12C have the same sizes. However, the sheet pieces 12A-12C may have different sizes. For example, only the sheet piece 12B to be sampled may have a size different from the size of the other sheet pieces 12A and 12C.

The widths and the lengths of the sheet pieces 12A-12C are determined appropriately depending on types or physical properties of the sheet pieces 12A-12C as the semifinished products or the finished products. For example, in a case where the finished products are building materials, a width of each sheet piece may be greater than or equal to 450 mm and smaller than or equal to 1600 mm. In this case, the length of each sheet piece may be greater than or equal to 3500 mm and smaller than or equal to 22500 mm. In this case, thicknesses of the sheet pieces 12A-12C are not particularly limited. However, if the sheet pieces 12A-12C are excessively thin, there may be a case where it is difficult to convey them with the conveying unit 11. Therefore, for example, a thickness of each sheet piece may be greater than or equal to 1 mm and smaller than or equal to 50 mm.

In the above-mentioned case where only a size of the sheet piece 12B to be sampled is made different from the size of the other sheet pieces 12A and 12C not to be sampled, the sheet piece 12B to be sampled may be, for example, greater than or equal to $1/30$ and smaller than or equal to $4/5$ each of the sheet pieces not to be sampled only in length. In this case, sizes of the sheet pieces 12A and 12C not to be sampled may be those in the above-described ranges.

The sheet pieces 12A-12C are conveyed by the conveying unit 11. An area defined by the bottom faces, the top faces, and both side walls of the sheet pieces 12A-12C that are being conveyed is a conveyance course 121. In particular, a plane of the conveyance course 121 including the bottom faces of the sheet pieces 12A-12C that are being conveyed, that is, a plane of the conveyance course 121 in contact with the conveying unit 11, may be referred to as a bottom face 121A of the conveyance course (see FIGS. 1B and 1C). A plane of the conveyance course 121 including the top faces of the sheet pieces 12A-12C that are being conveyed may be referred to as a top face 121B of the conveyance course 121 (see FIGS. 1B and 1C).

The pressing-up unit 13 may be installed near the conveying unit 11. The pressing-up unit 13 can press and support the sheet piece 12B that is being conveyed by the conveying unit 11 from the lower side, more specifically, from the bottom-face-121A side of the conveyance course 121, to press up the sheet piece 12B.

In this regard, the pressing-up unit 13 may be configured to, at this time, press up the entirety of the sheet piece 12B, for example, to above the conveyance course 121, more specifically, to above the top face 121B of the conveyance course 121. By thus configuring the pressing-up unit 13, it is possible to prevent the sheet piece 12B from interfering with the subsequent sheet piece 12A. In particular, as illustrated in FIG. 1C, concerning a part of the pressing-up unit 13 overlapping with the conveying unit 11 in a plan view of the conveyance course 121, also the entirety of the pressing-up unit 13 (excluding a rod member moving unit 133 that will be described later) may be pressed up to above the conveyance course 121, more specifically, above the top face 121B of the conveyance course 121, for preventing also the pressing-up unit 13 from interfering with the subsequent sheet piece 12A.

The specific configuration of the pressing-up unit 13 is not particularly limited as long as the pressing-up unit 13 can press up the sheet piece 12B without interfering with the conveying unit 11.

Next, a description will be made for a configuration example of the pressing-up unit 13 for a case where, as illustrated in FIGS. 1A-1C, the conveying unit 11 is a roller conveyer.

In this case, the pressing-up unit 13 may have a plurality of rod members 131A-131C. The specific arrangement of the rod members 131A-131C is not particularly limited as long as the rod members 131A-131C can press up the sheet piece 12B to be sampled. The rod members 131A-131C may be arranged to each extend along the width directions of the sheet piece 12B to be sampled, as illustrated in FIG. 1A, i.e., along the Y-axis directions, for example. The actual number of the rod members 131A-131C is not particularly limited, and may be freely selected depending on the size of the sheet piece 12B to be sampled, the number of the rollers of the conveying unit 11, and so forth. The actual shapes of the rod members 131A-131C are not particularly limited, may have any shapes such as round bars (cylinders), square bars (quadrangular prisms), or the like. In this regard, the rod member, from among the plurality of rod members, at an upstream side along the conveyance directions of the sheet pieces 12A-12C may be a round bar to prevent the sheet piece 12B to be sampled from being damaged. As in the example of the pressing-up unit 13 illustrated in FIGS. 1A-1C, the rod member 131A at an upstream side along the conveyance directions of the sheet pieces 12A-12C may be a round bar. As illustrated in FIGS. 1B and 1C, also all the rod members 131A-131C may be round bars.

For example, ends of the rod members 131A-131C may be fixed to a supporting member 132 that supports the rod members 131A-131C together. In the example of FIG. 1A, only one end of each of the rod members 131A-131C is fixed to the supporting member 132. However, the other end of each of the rod members 131A-131C may also be fixed to a supporting member.

The pressing-up unit 13 illustrated in FIGS. 1A-1C may have the rod member moving unit 133 for moving the rod members 131A-131C.

A specific manner of operating the rod member moving unit 133 to move the rod members 131A-131C is not particularly limited. The rod member moving unit 133 may move the rod members 131A-131C in a manner, for example, as will now be described.

As illustrated in FIG. 1B, the rod member moving unit 133 may move the rod members 131A-131C in the direction A or its opposite direction between a position below the conveyance course 121 and a position above the conveyance course 121. In more detail, the rod member moving unit 133 may move the rod members 131A-131C vertically in the direction A and the opposite direction between a position below the bottom face 121A of the conveyance course 121 and a position above the top face 121B of the conveyance course 121.

In this regard, for a case where the conveying unit 11 is a roller conveyer and the rod members 131A-131C are below the conveyance course 121, the rod members 131A-131C may be between the rollers 111 of the roller conveyer in parallel with the rollers 111.

In more detail, upon sampling the sheet piece 12B, the rod member moving unit 133 may move the rod members 131A-131C in the direction A, i.e., along the Z-axis directions, from a position below the conveyance course 121 as illustrated in FIG. 1B to a position above the conveyance course 121 as illustrated in FIG. 1C. Then, the sampled sheet piece 12B will move, due to inertia, from on the rod members 131A-131C of the pressing-up unit 13 onto the holding unit 14, as illustrated in FIG. 1C. As a result of the rod member moving unit 133 operating as above, it is possible to easily sample the sheet piece 12B that is being conveyed.

After the sampled sheet piece 12B thus moves onto the holding unit 14, the rod member moving unit 133 may move the rod members 131A-131C in the direction opposite to the direction A, to below the conveyance course 121, as illustrated in FIG. 1B. Thus, the rod members 131A-131C can be inserted between the rollers 111 of the roller conveyer in parallel with the rollers 111.

In a case where the rod members 131A-131C are fixed to the supporting member 132 to be integral with the supporting member 132, the rod member moving unit 133 can move also the rod members 131A-131C accordingly by moving the supporting member 132.

An actual configuration of the rod member moving unit 133 is not particularly limited. For example, the rod member moving unit 133 may include a driving unit including one or more selected from among an electric motor, a hydraulic or pneumatic jack, and so forth; and an arm that transmits power from the driving unit to the rod members 131A-131C or the supporting member 132.

An actual configuration of the pressing-up unit 13 is not limited to the above-mentioned configuration example having the above-mentioned plurality of rod members. The pressing-up unit 13 may be configured freely, in such a manner as to be able to sample the sheet piece 12B without interfering with the conveying unit 11, depending on an actual type of the conveying unit 11.

Next, a configuration example of the holding unit 14 will be described. The holding unit 14 may be placed above the conveyance course 121 on the downstream side of the pressing-up unit 13 along the conveyance directions of the sheet pieces 12A-12C. The holding unit 14 may be placed at such a position that the holding unit 14 does not interfere with the sheet piece 12A and 12C that are being conveyed.

When the pressing-up unit 13 has pressed up the sheet piece 12B that has been conveyed by the conveying unit 11 from below the conveyance course 121 to above the conveyance course 121, the sheet piece 12B moves onto the holding unit 14, due to inertia. Thus, the holding unit 14 can hold the sheet piece 12B.

For this purpose, the holding unit 14 may be placed at such a position that, when the pressing-up unit 13 has pressed up the sheet piece 12B, the sheet piece 12B can move onto the holding unit 14 due to inertia. In more detail, for example, the position of the holding unit 14 or a pressing-up height of the pressing-up unit 13 may be adjusted in such a manner that a holding surface 14A of the holding unit 14 and a holding surface 13A of the pressing-up unit 13 after the pressing-up unit 13 presses up the sheet piece 12B (see FIG. 1C) may be flush with one another. The holding surface 14A of the holding unit 14 is a surface on which the holding unit 14 holds the sheet piece 12B, and, for example, when the sheet piece 12B is placed on the holding unit 14, the holding surface 14A of the holding unit 14 is in the same plane as the bottom face of the sheet piece 12B. The holding surface 13A of the pressing-up unit 13 is a surface on which the pressing-up unit 13 holds the sheet piece 12B, and, for example, when the sheet piece 12B is placed on the pressing-up unit 13, the holding surface 13A of the pressing-up unit 13 is in the same plane as the bottom face of the sheet piece 12B.

In the example of FIG. 1C, the holding surface 13A of the pressing-up unit 13 and the holding surface 14A of the holding unit 14 are in a single horizontal plane that does not slope. However, the mode for carrying out the invention is not limited to the configuration. A plane including the holding surface 13A and the holding surface 14A may be a sloping plane where, for example, the height increases or decreases as a position in the plane moves toward the holding unit 14, i.e., along the X-axis directions. By adjusting an arrangement of the holding surface 13A of the pressing-up unit 13 and the holding surface 14A of the holding unit 14, sloping manners/degrees thereof, or the like, it is possible to omit a special arrangement with which the pressing-up unit 13 conveys the sheet piece 12B onto the holding unit 14.

An actual configuration of the holding unit 14 is not particularly limited as long as it can hold the sheet piece 12B. For example, as illustrated in FIGS. 1A-1C, in the same way as the pressing-up unit 13, the holding unit 14 may have a plurality of rod members (i.e., holding unit rod members) 141A-141C. An actual arrangement of the rod members 141A-141C is not particularly limited as long as they can hold the sheet piece 12B to be sampled. For example, the rod members 141A-141C may be arranged to each extend along the width directions of the sheet piece 12B to be sampled, i.e., along the Y-axis directions, as illustrated in FIG. 1A. The actual number of the rod members 141A-141C is not particularly limited, and may be freely determined depending on the size of the sheet piece 12B to be sampled or the like. Actual shapes of the rod members 141A-141C are not particularly limited, and may be round bars (cylinders), square bars (quadrangular prisms), or the like. However, the rod member from among the plurality of rod members at a pressing-up unit-13 side may be a round bar to prevent the sheet piece 12B to be sampled from being damaged. As in the example of the holding unit 14 illustrated in FIGS. 1A-1C, the rod member 141A at a pressing-up unit-13 side may be a round bar. As illustrated in FIGS. 1B and 1C, also all the rod members 141A-141C may be round bars.

As illustrated in FIG. 1A, the rod members 141A-141C may be integrated as a result of one ends of the rod members 141A-141C being fixed to a supporting member 142, for example. Although FIG. 1A illustrates an example where only one end of each of the rod members 141A-141C is fixed to the supporting member 142, the other end of each of the rod members 141A-141C may also be fixed to a supporting member.

The holding unit 14 may have any shape as long as it is configured to be able to hold the sheet piece 12B. Therefore, instead of the rod members 141A-141C, plate members or the like that can support the bottom face of the sheet piece 12B may be used. In this case, a holding unit moving unit that will be described below may be configured to move, instead of the rod members, the plate members or the like in a manner that will be described below.

The holding unit 14 may have a holding unit moving unit 143 that moves the rod members 141A-141C (see FIG. 1A).

The holding unit moving unit 143 may be configured, for example, to move the rod members 141A-141C to the outside of a zone above the conveyance course 121. In more detail, for example, the holding unit moving unit 143 may move the rod members 141A-141C in the direction B of FIG. 1A, i.e., along the Y-axis directions. As a result of the holding unit moving unit 143 thus operating to move the rod members 141A-141C to the outside of the zone above the conveyance course 121, it is possible to convey the sampled sheet piece 12B to the outside of the zone above the conveyance course 121, and take down the sheet piece 12B.

After the sampled sheet piece 12B is thus taken down, the holding unit moving unit 143 may move the rod members 141A-141C in the direction opposite to the direction B that is reverse to the above-mentioned direction, and may place the rod members 141A-141C at the position illustrated in FIG. 1A.

The direction in which the rod members 141A-141C are moved to the outside of the zone above the conveyance course 121 is not limited to the above-mentioned example. For example, in FIG. 1A, a rotational shaft may be used that extends in a direction perpendicular to FIGS. 1A and is fixed to the supporting member 142. Then, the rotational shaft may be used to rotate the rod members 141A-141C in a horizontal plane to move the rod members 141A-141C to the outside of the zone above the conveyance course 121.

In the above-mentioned case where the rod members 141A-141C are fixed to the supporting member 142 to be integral with the supporting member 142, the holding unit moving unit 143 can move also the rod members 141A-141C accordingly by moving the supporting member 142.

The sampling apparatus according to the mode for carrying out the invention may include only the pressing-up unit 13 and the holding unit 14. However, the sampling apparatus may include the conveying unit 11, the pressing-up unit 13, and the holding unit 14.

Further, the sampling apparatus may further include other members as the necessity arises.

For example, for a case where the sampling apparatus according to the mode for carrying out the invention includes the conveying unit 11, the sampling apparatus according to the mode for carrying out the invention may include a cutting unit and an upstream-side conveying unit on the upstream side of the conveying unit 11.

In more detail, the sampling apparatus according to the mode for carrying out the invention may further include a cutting unit configured to cut a sheet piece from a sheet product, and an upstream-side conveying unit configured to convey the sheet product to send it to the cutting unit. In this case, as described above, the conveying unit 11 may be placed on the downstream side of the cutting unit. For a case where the above-described conveying unit 11 is in particular distinguished from the upstream-side conveying unit, the conveying unit 11 may be referred to as a "downstream-side conveying unit".

A sheet product is a strip-shaped semifinished product or a strip-shaped finished product, is acquired as a result of, for example, a raw material being shaped, is conveyed before being cut, and is cut into sheet pieces. The sheet product is thus cut so that a sheet piece that is a part of the sheet product is separated from the sheet product. By cutting the sheet product a plurality of times, it is possible to acquire a plurality of sheet pieces.

An actual shape of a cutting line along which a sheet product is cut is not particularly limited. For example, a cutting line along which a sheet product is cut may extend along the width directions of the sheet product, that is, a line perpendicular to the sheet product conveyance directions. Therefore, a sheet product may be longer along the conveyance directions than a sheet piece that is cut from the sheet product. Thus, a sheet product may be a strip-shaped product, for example, as described above.

A configuration of the cutting unit is not particularly limited. For example, a cutting unit that can cut a sheet product that is being conveyed along a cutting line along the width directions of the sheet product may be used. More specifically, for example, a rotary cutter, a rotary saw, or the like may be used.

A cutting line along which a sheet product is cut may have any shape. For example, a cutting line along which a sheet product is cut may extend along the sheet product conveyance directions (the directions along which a sheet product is conveyed). Therefore, the cutting unit is not limited to one having the above-described configuration. For example, a cutting unit that cuts a sheet product along a cutting line extending along the sheet product conveyance directions or a cutting line having any other shape may be used.

The pressing-up unit 13 may be interoperated with the cutting unit. For example, the pressing-up unit 13 may sample a sheet piece each time the cutting unit carries out cutting operations a predetermined number of times.

A configuration of the upstream-side conveying unit is not particularly limited as long as the upstream-side conveying unit can convey a sheet product to send it to the cutting unit. For example, the upstream-side conveying unit may include one or more selected from among a roller conveyer, a belt conveyer, a chain conveyer, and so forth. The conveying unit 11 and the upstream-side conveying unit may be the same as one another or different from one another.

In a case where the sampling apparatus according to the mode for carrying out the invention has the cutting unit, the sampling apparatus according to the mode for carrying out the invention may further include, for example, a separating unit that increases a distance between a sheet product and a sheet piece that is cut from the sheet product by the cutting unit or a distance between sheet pieces each of which is cut from a sheet product by the cutting unit.

A distance between adjacent sheet pieces that are cut from a sheet product by the cutting unit and conveyed in succession by the conveying unit 11 is very small immediately after the sheet pieces are cut from the sheet product. Thus, the sheet pieces are close to one another at this time. Therefore, depending on a speed at which sheet pieces are conveyed by the conveying unit 11, it is necessary to increase a speed (a moving speed) at which the pressing-up unit 13 presses up a sheet piece, when the sheet piece is sampled by the pressing-up unit 13, to prevent the sheet piece from coming into contact with a subsequently conveyed sheet piece.

In this regard, the above-mentioned separating unit may be used to increase a distance between a sheet product and a sheet piece that is cut from the sheet product by the cutting unit or a distance between sheet pieces each of which is cut from a sheet product by the cutting unit. Thereby, it becomes unnecessary to excessively increase a speed at which the pressing-up unit 13 presses up a sheet piece, and, in particular, it is possible to easily sample a sheet piece.

An actual configuration of the separating unit is not particularly limited. For example, the separating unit may include a separating unit control unit that controls at least a part of the conveying unit 11 to control a speed of conveying a sheet piece.

The separating unit control unit may control at least a part of the conveying unit 11 to increase a speed of conveying, i.e., to accelerate a sheet piece to be faster than a speed of conveying a sheet piece at an upstream side along the conveyance directions, for example, to be faster than a speed of conveying a sheet piece at a zone where a sheet piece has passed immediately before. For example, for a case where the conveying unit 11 is a roller conveyer, the separating unit control unit can control the conveyance speed of at least some of the rollers of the roller conveyer to accelerate a sheet piece.

The separating unit can increase a distance, as described above, between sheet pieces that have been cut from a sheet product by the cutting unit, for example. For this purpose, the separating unit control unit may control at least a part of the conveying unit 11 in such a manner that a speed of conveying a sheet piece by the part of the conveying unit 11 is higher than a speed of conveying a sheet product by the upstream-side conveying unit on the upstream side of the cutting unit, for example.

By thus configuring the separating unit control unit, it is possible to convey a sheet piece after being cut from a sheet product by the cutting unit and sent to the conveying unit 11, appreciably forward, during a period from when the sheet piece has been sent to the conveying unit 11 until a subsequent sheet piece is sent to the conveying unit 11. Thus, it is possible to sufficiently increase a distance between a sheet piece already conveyed by the conveying unit 11 after being cut from a sheet product by the cutting unit and a sheet piece that has been cut from the sheet product. In this case, it is also possible to increase a distance between the sheet product and the sheet piece.

For this purpose, the separating unit control unit may control a conveyance speed of the conveying unit 11, for example, at least at a part of a segment of the conveying unit 11 between the cutting unit and the pressing-up unit 13. In particular, the separating unit control unit may control a conveyance speed of a part of the conveying unit 11 at a zone immediately after the cutting unit.

However, a part of the conveying unit 11 to be controlled by the separating unit control unit is not limited to the above-mentioned part. For example, the separating unit control unit may control a part of the conveying unit 11 at a zone, such as a zone immediately after the pressing-up unit 13, where an operation is not affected even if a conveyance speed is increased and it is requested to increase a distance between sheet pieces.

Further, the sampling apparatus according to the mode for carrying out the invention may further include a speed adjusting unit that adjusts a speed of conveying a sheet piece at a zone including at least a part of a segment of the conveying unit 11 on the upstream side of the pressing-up unit 13 along the sheet piece conveyance directions.

As described above, in the sampling apparatus according to the mode for carrying out the invention, it is possible to sample a sheet piece as a result of the pressing-up unit 13 pressing up the sheet piece that is being conveyed to above the conveyance course 121 and the holding unit 14 holding the sheet piece. However, after being pressed up by the pressing-up unit 13 and held by the holding unit 14, a sheet piece on the holding unit 14 may move too greatly due to inertia of the sheet piece that has been conveyed, depending on the sheet piece conveyance speed (the speed at which a sheet piece is conveyed by the conveying unit 11). Also, there may be a case where, after the pressing-up unit 13 presses up a sheet piece, the sheet piece does not move completely onto the holding unit 14, depending on the sheet piece conveyance speed.

Therefore, the sampling apparatus according to the mode for carrying out the invention may include the speed adjusting unit that adjusts the sheet piece conveyance speed at a zone including at least a part of a segment of the conveying unit 11 on the upstream-side of the pressing-up unit 13 along the sheet piece conveyance directions. By using the speed adjusting unit, a sheet piece can reach the holding unit due to inertia without the need of conveying power, and also, the sheet piece is prevented from moving too greatly still after reaching the holding unit 14. This is because the sheet piece that has been pressed up by the pressing-up unit 13 is appropriately accelerated or decelerated by the speed adjusting unit.

An actual configuration of the speed adjusting unit is not particularly limited. The speed adjusting unit may include a speed adjusting unit control unit that adjusts a speed of conveying a sheet piece by the conveying unit 11 at a zone including at least a part of a segment of the conveying unit 11 on the upstream-side of the pressing-up unit 13 along the sheet piece conveyance directions.

What is controlled by the speed adjusting unit control unit is not limited to the part of the segment of the conveying unit 11 on the upstream-side of the pressing-up unit. For example, the speed adjusting unit control unit may control the sheet piece conveyance speed also at a zone at which the pressing-up unit 13 is placed.

An actual degree of accelerating or decelerating a sheet piece by the speed adjusting unit is not particularly limited. For example, a sheet piece may be accelerated or decelerated in such a degree that the sheet piece can reach the holding unit 14 due to inertia and the sheet piece can be prevented from moving too greatly even after reaching the holding unit 14.

In a case where the sampling apparatus according to the mode for carrying out the invention includes the speed adjusting unit in addition to the separating unit, the separating unit may include a separating unit control unit that adjusts the sheet piece conveyance speed of the conveying unit 11 at a separating zone. The separating zone is, for example, at least a part of the conveying unit 11 immediately subsequent to the cutting unit. The speed adjusting unit may include a speed adjusting unit control unit that accelerates or decelerates a sheet piece conveyed by the conveying unit 11 at a speed adjusting zone. The speed adjusting zone is at least a part of a segment of the conveying unit 11 between the separating zone and the pressing-up unit 13. For example, in a case where the conveying unit 11 is a roller conveyer, the speed adjusting unit may include the speed adjusting unit control unit that accelerates or decelerates at least some of the rollers that are at the speed adjusting zone from among the rollers of the roller conveyer that is the conveying unit, i.e., controls the rotational speeds of these rollers to be increased or decreased.

The sampling apparatus according to the mode for carrying out the invention may further include an evaluating unit that evaluates a sampled sheet piece. An actual configuration of the evaluating unit is not particularly limited. For example, the evaluating unit may include at least one selected from among a unit that measures the size of the sampled sheet piece; a unit that measures the weight of the sampled sheet piece; a unit that measures an angle of a corner of the sample sheet piece; a unit that measures the specific gravity of the sheet piece; a unit that measures surface texture or a color of the sheet piece; and so forth. The evaluating unit may actually include, for example, one selected from among a length measuring gauge, a weight meter, an angle meter, a gravimeter, a surface roughness meter, a colorimeter, and so forth.

With the above-described sampling apparatus according to the mode for carrying out the invention, it is possible to easily sample a sheet piece that is being conveyed. Therefore, it is possible to reliably sample and evaluate a sheet piece at any timing or a predetermined timing. Thus, it is possible to detect a defect or the like in a manufacturing process, and it is possible to contribute to reduction in the defect rate.

In addition, with the sampling apparatus according to the mode for carrying out the invention, it is possible to sample a sheet piece that has been manufactured and is being conveyed, throughout the full width. Therefore, it is possible to evaluate a sheet piece that has been manufactured and is being conveyed, throughout the full width that is the same as the width of a semifinished product or a finished product that is also being conveyed in the same way. Therefore, it is possible to detect a defect or the like in particular in a manufacturing process, and it is possible to contribute to reduction in the defect rate.

[Sheet Member Manufacturing Apparatus and Gypsum Building Material Manufacturing Apparatus]

Next, configuration examples of a sheet member manufacturing apparatus and a gypsum building material manufacturing apparatus according to a mode for carrying out the invention will be described.

A sheet member manufacturing apparatus according to a mode for carrying out the invention may include the above-described sampling apparatus.

In addition, as a sheet member mentioned above, it is also possible to manufacture a gypsum building material, for example. In this case, the sheet member manufacturing apparatus may be a gypsum building material manufacturing apparatus. Therefore, the gypsum building material manufacturing apparatus according to a mode for carrying out the invention may also include the above-described sampling apparatus.

Each of the sheet member manufacturing apparatus and the gypsum building material manufacturing apparatus may include, in addition to the above-described sampling apparatus, various units needed to manufacture sheet members or gypsum building materials.

For example, for a case where raw materials are mixed, each of the sheet member manufacturing apparatus and the gypsum building material manufacturing apparatus may include a mixing unit (a mixer) that mixes the raw materials. In addition, each of the sheet member manufacturing apparatus and the gypsum building material manufacturing apparatus may include a shaping apparatus or the like that shapes or processes the raw materials, a raw material mixture prepared by the mixing unit, a raw material slurry, or the like so that the raw materials, the raw material mixture, the raw material slurry, or the like may have desired shape and size.

Below, as a configuration example of the sheet member manufacturing apparatus and the gypsum building material manufacturing apparatus, an apparatus configuration will be described for a case of, for example, manufacturing a gypsum board that is a sheet member and is a gypsum building material.

A gypsum building material manufacturing apparatus 20 illustrated in FIG. 2 includes a mixer 21 that is a mixing unit mixing raw materials; a shaping apparatus 22 that shapes a raw material slurry prepared by the mixer 21, i.e., a gypsum slurry in the example of FIG. 2; and a sampling apparatus 27. Below, the configuration example of the gypsum building material manufacturing apparatus 20 will be described in detail.

First, the mixer 21 will now be described.

The mixer 21 may be placed at a predetermined position in relation to a conveyance line that is used to convey a front-side covering base paper sheet (that will be described later), or the like. For example, the mixer 21 may be placed above or besides the conveyance line. The single mixer 21 can prepare a gypsum slurry by kneading calcined plaster that is a raw material of the gypsum slurry with water and, in some cases, various additives in addition.

The calcined plaster is also called calcium sulfate hemihydrate, and is a hydraulic inorganic composition. As the calcined plaster, $\beta$-type calcined plaster or $\alpha$-type calcined plaster may be solely used; or a mixture of $\beta$-type calcined plaster and $\alpha$-type calcined plaster may be used. The $\beta$-type calcined plaster is acquired from calcining, in the atmosphere, any one of natural gypsum, byproduct gypsum, desulfogypsum acquired through flue gas desulfurization, and so forth; or is acquired from calcining, in the atmosphere, a mixture of any combination of natural gypsum, byproduct gypsum, desulfogypsum acquired through flue gas desulfurization, and so forth. The α-type calcined plaster is acquired from calcining, in water (which may be a steam environment), any one of natural gypsum, byproduct gypsum, desulfogypsum acquired through flue gas desulfurization, and so forth; or is acquired from calcining, in water (which, same as above, may be a steam environment), a mixture of any combination of natural gypsum, byproduct gypsum, desulfogypsum acquired through flue gas desulfurization, and so forth.

For a case where a gypsum building material such as a gypsum board is manufactured, the calcined plaster used as the raw material of the gypsum building material may include β-type calcined plaster. Further, it is preferable that a main ingredient of the calcined plaster that is used as the raw material of the gypsum building material is β-type calcined plaster. The feature that "a main ingredient of the calcined plaster that is used as the raw material of the gypsum building material is β-type calcined plaster" means that β-type calcined plaster has a mass ratio of greater than 50% in the calcined plaster used as the raw material of the gypsum building material. In this regard, the calcined plaster to be used as the raw material may contain only β-type calcined plaster for manufacturing the gypsum building material.

α-type calcined plaster can be acquired from pressing and calcining, in water or in a steam environment, gypsum dihydrate such as natural gypsum with the use of an autoclave. In contrast, β-type calcined plaster can be acquired from calcining, at normal pressure in the atmosphere, gypsum dihydrate such as natural gypsum. Thus, the β-type calcined plaster can be manufactured with higher productivity than the α-type calcined plaster.

As the additives, for example, one or more selected from among an adhesiveness improving agent such as starch, polyvinyl alcohol, or the like to improve adhesiveness between a gypsum hardened product (acquired as a result of gypsum slurry being hardened) and a gypsum board base paper sheet (that may be referred to as a front-side covering base paper sheet or a back-side covering base paper sheet); an inorganic fiber such as a glass fiber and a lightweight aggregate; a refractory material such as vermiculite; a retarder; a setting accelerator; a water reducing agent; a bubble diameter adjusting agent such as a sulfosuccinate type surfactant; a water repellent agent such as silicone, paraffin, or the like; organic carboxylic acid; organic carboxylate; and so forth may be used.

The calcined plaster and some of the additives, i.e., for example, solid additives, may be previously mixed and agitated to form a gypsum composition that is a mixture which is then supplied to the mixer 21.

In this regard, gypsum slurry may be prepared at any density as a result of bubbles being added at one or more selected from among dispensing ports 211a, 211b, and 211c that are used to take out gypsum slurry and the amount of bubbles to be added being adjusted. For example, gypsum slurry 25 may be prepared at a high density from the dispensing ports 211a and 211b as a result of no bubbles or few bubbles being added at the dispensing ports 211a and 211b. Also gypsum slurry 26 may be prepared from the dispensing port 211c at a low density as a result of more bubbles being added at the dispensing port 211c than bubbles added to prepare gypsum slurry 25 of the high density.

Thus, in the mixer 21 of the gypsum building material manufacturing apparatus 20, it is possible to implement the gypsum slurry manufacturing process of kneading the calcined plaster that is the raw material and water, and, if necessary, various additives and bubbles, to manufacture the two types 25 and 26 of gypsum slurry.

At the dispensing ports 211a, 211b, and 211c, delivery tubes 212a and 212b and a pipe conduit 212c for supplying prepared gypsum slurry to the shaping apparatus 22 may be installed.

In FIG. 2, the example where the single mixer 21 manufactures the gypsum slurry of the low density and the gypsum slurry of the high density is illustrated. However, instead, two mixers may be used, and the respective mixers may manufacture gypsum slurry 26 of the low density and the gypsum slurry 25 of the high density.

Next, a configuration example of the shaping apparatus 22 will now be described.

The shaping apparatus 22 may include, for example, roller coaters 221a and 221b that spread the gypsum slurry onto the front-side covering base paper sheet 23 and the back-side covering base paper sheet 24; a shaping device 223; and so forth, for example.

In FIG. 2, the front-side covering base paper sheet 23 as a front-side material is conveyed leftward along the manufacturing line.

The gypsum slurry 25 of the high density prepared by the mixer 21 is supplied onto the front-side covering base paper sheet 23 and the back-side covering base paper sheet 24 through the delivery tubes 212a and 212b on the upstream-sides of the roller coaters 221a and 221b along the conveyance directions.

The gypsum slurry 25 of the high density thus supplied onto the front-side covering base paper sheet 23 and the back-side covering base paper sheet 24 reaches spreading points of the roller coaters 221a and 221b, and is spread at the spreading points. The roller coaters 221a and 221b may include coating rollers 2211a and 2211b, receiving rollers 2212a and 2212b, and dross removing rollers 2213a and 2213b, respectively. The gypsum slurry 25 can be spread onto the front-side covering base paper sheet 23 and the back-side covering base paper sheet 24 when the covering base paper sheets 23 and 24 pass between the coating rollers 2211a and 2211b and the receiving rollers 2212a and 2212b.

As a result, a thin layer of the gypsum slurry 25 is formed on the front-side covering base paper sheet 23. Thereafter, the front-side covering base paper sheet 23 is folded in such a manner that both side edge portions thereof extend upward and then further extend inside. Also on the back-side covering base paper sheet 24, a thin layer of the gypsum slurry 25 is formed. However, different from the front-side covering base paper sheet 23, the back-side covering base paper sheet 24 is not folded. In the example of FIG. 2, the roller coaters 221a and 221b are used to coat the front-side covering base paper sheet 23 and the back-side covering base paper sheet 24 with the gypsum slurry 25. However, an embodiment is not limited to this example. For example, only one of the front-side covering base paper sheet 23 and the back-side covering base paper sheet 24 may be coated with the gypsum slurry 25 with the use of one of the roller coaters 221a and 221b. In yet another example, the gypsum slurry 25 may be placed only at both side edge portions of the front-side covering base paper sheet 23.

The front-side covering base paper sheet 23 is further conveyed continuously in the same conveyance direction while the back-side covering base paper sheet 24 is turned by a turning roller 222 to be conveyed in the same conveyance direction as that of the front-side covering base paper sheet 23. Thus, both the front-side covering base paper sheet 23 and the back-side covering base paper sheet 24 are conveyed in the same direction to reach the shaping device 223. There, the gypsum slurry 26 of the low density is supplied from the mixer 21 through the pipe conduit 212*c* to between the respective thin layers formed on the front-side covering base paper sheet 23 and the back-side covering base paper sheet 24 as mentioned above. Consequently, a continuous layered product is formed between the front-side covering base paper sheet 23 and the back-side covering base paper sheet 24 accordingly. In the continuous layered product, the layer of the gypsum slurry 25 of the high density, the layer of the gypsum slurry 26 of the low density, and the layer of the gypsum slurry 25 of the high density are overlaid on each other in the stated order. Then, the resulting product is sent to and caused to pass through the shaping device 223 that shapes the product to have a predetermined thickness for gypsum boards. Through the above-described process, the gypsum boards can be formed.

However, an embodiment is not limited to the above-described example where the gypsum slurry of the high density and the gypsum slurry of the low density are used. For example, gypsum slurry of a single density may be manufactured, and may be supplied onto a base paper sheet for gypsum boards.

In more detail, for example, gypsum slurry having a predetermined density may be supplied and deposited onto a front-side covering base paper sheet that is being continuously conveyed. Then, both side edge portions of the front-side covering base paper sheet may be folded along given ruled lines to extend upward and then further extend inside so that the front-side covering base paper sheet may partially envelop the deposited layer of gypsum slurry. Thereafter, on the deposited layer of the gypsum slurry that is partially enveloped by the front-side covering base paper sheet, a back-side covering base paper sheet that is being conveyed in the same conveyance speed can be placed. Then, same as above, the resulting product is sent to and caused to pass through a shaping device that shapes the product to have a predetermined thickness and width for gypsum boards. Also through the above-described process, the gypsum boards can be formed. In this case, between the front-side covering base paper sheet and the back-side covering base paper sheet, the layer of gypsum slurry having the single density is formed.

Thus, in the shaping apparatus 22 of the gypsum building material manufacturing apparatus 20, the shaping process of shaping the gypsum slurry can be implemented.

On the downstream-side of the shaping apparatus 22, the above-described sampling apparatus 27 can be provided. In the sampling apparatus 27, a sheet piece that is being conveyed can be sampled if necessary. A sheet piece that has not been sampled will be conveyed by the conveying unit 11, and, if necessary, a predetermined work or process is carried out on the sheet piece. Thus, a sheet member, for example, a gypsum building material, is acquired.

As described above, the sampling apparatus 27 may include also the conveying unit 11, the cutting unit, and so forth. Thus, in the sampling apparatus 27, a sheet piece having any size is cut from a shaped product, that is a sheet product formed by the shaping apparatus 22, by the cutting unit not illustrated, for example. Thus, a sheet piece that is being conveyed by the conveying unit, i.e., for example, a semifinished product of a gypsum building material, may be sampled and evaluated.

In calcined plaster (hemihydrate gypsum), due to a hydration reaction, needle crystals of gypsum dihydrate are produced and the calcined plaster is solidified, coagulated, and hardened. In this regard, for a case where the sampling apparatus 27 has the cutting unit with which a sheet piece is cut from a shaped product (i.e., a sheet product) after the shaping apparatus 22 produces the sheet product, a distance (a conveyance distance) between the shaping apparatus 22 and the cutting unit may be selected appropriately. That is, the distance between the shaping apparatus 22 and the cutting unit is such that, before the cutting unit cuts a sheet piece from a sheet product, a hydration reaction proceeds so that the sheet product can come to have solidity that is suitable for the cutting unit to cut the sheet piece therefrom.

Thus, between the shaping apparatus 22 and the cutting unit in the gypsum building material manufacturing apparatus 20 illustrated in FIG. 2, the hardening process of hardening a shaped product (i.e., a sheet product) shaped through the shaping process can be implemented. The cutting unit then can carry out a cutting process of cutting a piece of a desired size from a hardened product. It is also possible to provide the cutting unit separately from the sampling apparatus 27.

The configuration of the sampling apparatus 27 has been described above. Therefore, duplicate description will be omitted.

Note that an example where, as a sheet member and as a gypsum building material, a gypsum board is manufactured has been described. However, an embodiment is not limited this example. For example, the base paper sheet for gypsum boards that is the front-side material may be changed to a glass fiber nonwoven fabric (i.e., glass tissue), a glass mat, or the like; the glass fiber nonwoven fabric or the glass mat may be placed on a front side, embedded near a front side, or the like; and thus, various gypsum building materials such as glass mat gypsum boards, gypsum boards containing glass fiber nonwoven fabric, and so forth may be manufactured.

In addition, also various sheet members other than gypsum building materials, i.e., for example, members for electronic components, other ceramic products such as various structural materials, resin products, and so forth may be manufactured.

In this regard, for a case where, as sheet members, ceramic products (i.e., a slag gypsum board, a cement board, and so forth), resin products, or the like other than above-mentioned gypsum building materials are manufactured, the configurations of the mixing unit and the shaping apparatus are not limited to the above-mentioned configurations. That is, the mixing unit and the shaping apparatus having configurations suitable for a raw material or a product to be manufactured can be used.

The elements included in each of the sheet member manufacturing apparatus and the gypsum building material manufacturing apparatus according to the mode for carrying out the invention are not limited to the mixing unit such as the mixer, the shaping apparatus, and the sampling apparatus described above. Each of the sheet member manufacturing apparatus and the gypsum building material manufacturing apparatus according to the mode for carrying out the invention can further include various apparatuses/units appropriately as the necessity arises.

For example, each of the sheet member manufacturing apparatus and the gypsum building material manufacturing apparatus according to the mode for carrying out the invention may include an inverting unit that inverts, upside down, a shaped product that is being conveyed; a decelerating unit; a drying unit that dries a shaped product or the like; a calcining unit that calcines a shaped product or the like; a (second) cutting unit that further cuts a piece having a size of a finished product from a piece that has been cut by the above-described (first) cutting unit; and so forth. The decelerating unit may be used as a decelerating unit control unit for, for a case where the sheet member manufacturing apparatus has the inverting unit for example, decreasing a sheet piece conveyance speed so that the sheet piece may be caused to reliably stop on the inverting unit. The decelerating unit may have, for example, a configuration that is same as or similar to the above-described speed adjusting unit except that the decelerating unit is specialized for decelerating a sheet piece.

In addition, the number of sampling apparatuses 27 included in each of the sheet member manufacturing apparatus and the gypsum building material manufacturing apparatus according to the mode for carrying out the invention is not limited to one. A desired number of sampling apparatuses 27 can be installed at places along the manufacturing line of the manufacturing apparatus where sampling and evaluation are needed.

The above-described sheet member manufacturing apparatuses and gypsum building material manufacturing apparatuses according to the mode for carrying out the invention include the above-described sampling apparatuses. Therefore, it is possible to easily sample a sheet piece that is being conveyed. Because it is thus possible to reliably sample and evaluate a sheet piece at any timing or a predetermined timing, it is possible to detect a defect or the like in a manufacturing process, and it is possible to contribute to reduction in the defect rate.

In addition, it is possible to evaluate a sampled sheet piece throughout its width. Therefore, it is possible to evaluate a sampled sheet piece throughout its width same as the width of a semifinished product or a finished product that is also being conveyed. Therefore, it is possible to detect a defect or the like in particular in the manufacturing process, and it is possible to contribute to reduction in the defect rate.

EMBODIMENTS

Below, the present invention will be described in more detail with reference to embodiments of the present invention; the present invention is not limited to the embodiments.

First Embodiment

In a first embodiment, with the use of the gypsum building material manufacturing apparatus 20 described above with reference to FIG. 2, gypsum boards that are gypsum building materials are manufactured. In this regard, manufactured semifinished products for gypsum boards are sampled.

As described above with reference to FIG. 2, the gypsum building material manufacturing apparatus 20 illustrated in FIG. 2 includes the mixer 21 that is the mixing unit that mixes a raw material including calcined plaster; the shaping apparatus 22 that shapes gypsum slurry that has been prepared through the mixer 21; and the sampling apparatus 27. Because the various units and the apparatuses used in the gypsum building material manufacturing apparatus 20 have been already described above, duplicate description will be omitted.

Now, a configuration of the sampling apparatus 27 and the ancillaries (hereinafter, which may be simply referred to as a "downstream-side apparatus") placed on the downstream side of the shaping apparatus 22 in the gypsum building material manufacturing apparatus 20 according to the first embodiment will be described with reference to FIGS. 3A and 3B.

Figure 3B:
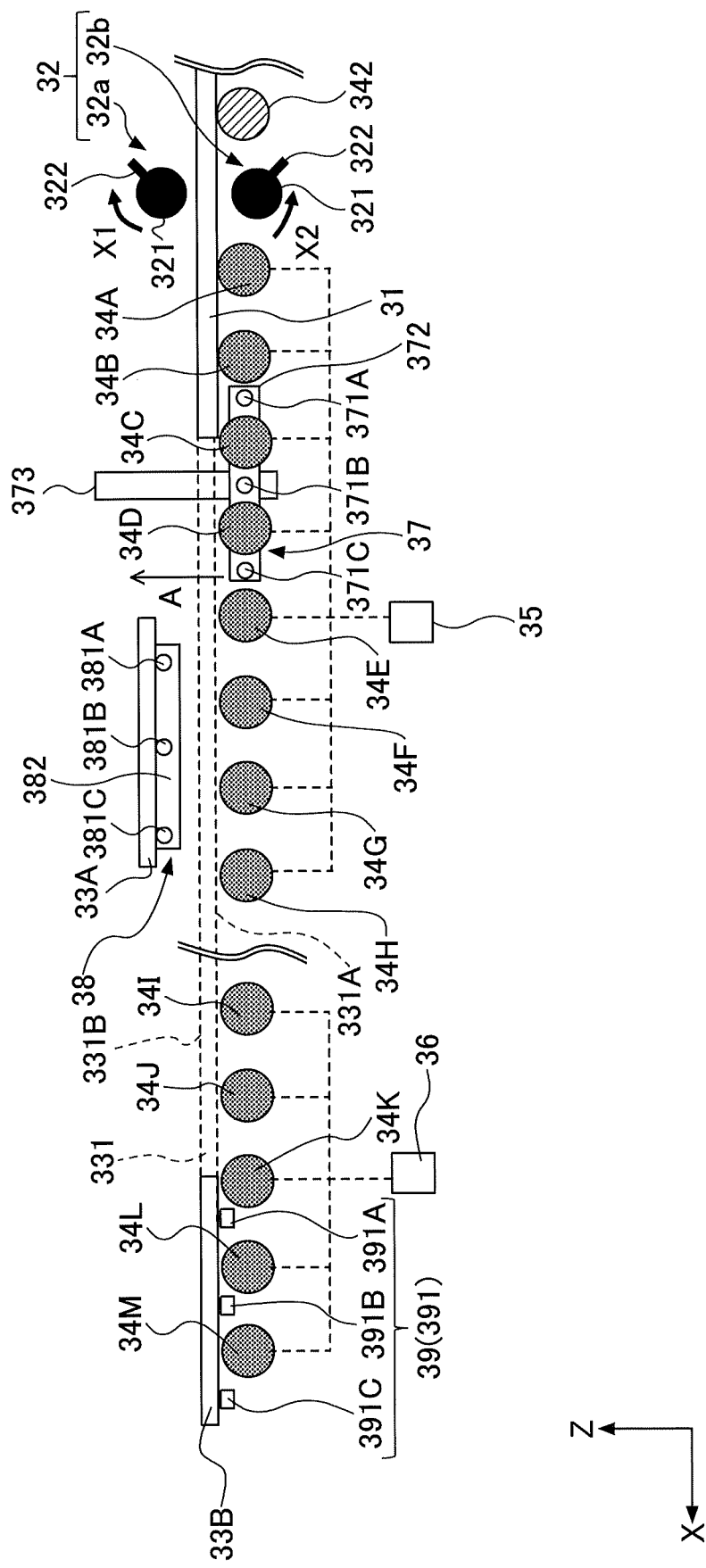
FIG. 3B illustrates the downstream-side apparatus according to the first embodiment of the present invention.

FIG. 3A is a plan view of the downstream-side apparatus 30, and FIG. 3B is a schematic sectional view taken along a b-b' line of FIG. 3A.

In the downstream-side apparatus 30, a strip-shaped continuous semifinished product for gypsum boards that is a sheet product 31 shaped by the above-described shaping apparatus 22 is conveyed along the X-axis directions in FIGS. 3A and 3B by an upstream-side conveying unit 342; and a piece is coarsely cut from the sheet product 31 by a cutting unit 32.

As the cutting unit 32, a rotary cutter is used according to the first embodiment. For example, as illustrated in FIGS. 3A and 3B, the rotary cutter 32 may have a unit 32a that has a blade 322 placed on a surface of a rotating shaft 321 that extends parallel to the Y-axis; and a unit 32b that has the same structure as the unit 32a. The pair of units 32a and 32b are turned in directions X1 and X2 illustrated in FIG. 3B, respectively; and the respective blades 322 cut a sheet piece from the sheet product 31 in such a manner as to have the sheet product 31 inserted therebetween when the respective blades 322 have reached positions at which the blades 322 face one another.

After thus being cut, sheet pieces 33A and 33B that are semifinished products for gypsum boards further conveyed along the X-axis directions by the conveying unit 34. As the conveying unit 34, a roller conveyer that includes a plurality of rollers 34A-34O are used as illustrate in FIGS. 3A and 3B. FIGS. 3A and 3B illustrate a state where the sheet piece 33A has been sampled.

In this regard, a separating unit 35 is provided (see FIG. 3B) for a pressing-up unit 37 and a holding unit 38, which will be described later, to be able to sample a sheet piece easily even in a state where a distance between adjacent sheet pieces immediately subsequent to the cutting unit 32 is small. The separating unit 35 is provided also for securing a time required for inverting a sheet piece by an inverting unit 39. According to the first embodiment, the separating unit 35 is configured as a separating unit control unit that controls a segment of the conveying unit 34 that conveys the sheet pieces 33A and 33B, in such a manner that the conveyance speed will be higher than the conveyance speed of the upstream-side conveying unit 342.

In more detail, the separating unit 35 is configured as the separating unit control unit that controls the speed of conveying the sheet pieces 33A and 33B for the segment of the conveying unit 34 on the downstream side of the cutting unit at a zone where the pressing-up unit 37 and the holding unit 38 are placed. In more detail, the separating unit control unit controls the speed at which the rollers 34A-34H convey the sheet pieces 33A and 33B.

By providing the separating unit 35, it is possible to convey a sheet piece after being cut by the cutting unit 32 quickly to the downstream side, so that it is possible to secure a sufficient distance from a sheet piece that will be cut subsequently.

In addition, the downstream-side apparatus 30 further includes a decelerating unit (see FIG. 3B) for the purpose that the inverting unit 39 that will be described later can easily invert a sheet piece.

According to the first embodiment, the decelerating unit 36 is configured as a decelerating unit control unit that controls a conveyance speed of a segment of the conveying unit 34 that conveys the sheet piece 33B which is not sampled, in such a manner as to decrease the conveyance speed to be lower than the conveyance speeds of other segments of the conveying unit 34, i.e., to decelerate the sheet piece 33B.

In more detail, the decelerating unit 36 is the decelerating unit control unit that controls the speed at which the rollers 34I-34M of the conveying unit 34 convey the sheet piece 33B at a zone where the inverting unit 39 is placed and a zone immediately before it.

By providing the decelerating unit 36, the sheet piece 33B can be caused to stop on the inverting unit 39 more reliably when the inverting unit 39 is to invert the sheet piece 33B.

Elements of the pressing-up unit 37 are placed between the rollers 34B-34E of the conveying unit 34.

The pressing-up unit 37 includes, as the elements, a plurality of rod members 371A-371C each of which is a round bar (i.e., a cylinder). The rod members 371A-371C are fixed to a supporting member 372. The pressing-up unit 37 further includes a rod member moving unit 373 for moving the rod members 371A-371C.

The rod member moving unit 373 is configured to move the rod members 371A-371C by moving the supporting member 372. Although not illustrated in detail in the drawing, the rod member moving unit 373 further includes an arm that moves the supporting member 372 and a hydraulic unit that drives the arm.

The rod member moving unit 373 is configured to move the rod members 371A-371C along the Z-axis directions illustrated in FIG. 3B. An example of operation of the rod member moving unit 373 will now be described in more detail.

First, the rod members 371A-371C are placed lower than the bottom face 331A (see FIG. 3B) of a conveyance course 331 of the sheet pieces 33A and 33B between rollers of the roller conveyer that is the conveying unit 34 in parallel with the rollers.

Then, the rod member moving unit 373 moves the rod members 371A-371C in the direction A (see FIG. 3B) from the position below the bottom face 331A of the conveyance course 331 to a position above the top face 331B of the conveyance course 331. As a result, it is possible to easily sample a sheet piece when the sheet piece has been conveyed to above the pressing-up unit 37.

After sampling the sheet piece, the rod member moving unit 373 moves the rod members 371A-371C in the direction opposite to the direction A to return the rod members 371A-371C to the state before the sampling. In more detail, the rod members 371A-371C are moved to enter a state where the rod members 371A-371C are below the bottom face 331A of the conveyance course 331 of the sheet pieces 33A and 33B between the rollers of the roller conveyer that is the conveying unit 34 in parallel with the rollers. FIGS. 3A and 3B illustrate a state where the rod members 371A-371C have been returned to the position of before the sampling.

The holding unit 38 is placed on the downstream side of the pressing-up unit 37 along the conveyance course 331 of sheet pieces above a zone where the rollers 34E-34H of the conveying unit 34 are placed. The sheet piece 33A sampled by the pressing-up unit 37 moves to the holding unit 38 due to inertia so that, as illustrated in FIGS. 3A and 3B, the sheet piece 33A can be held by the holding unit 38.

The holding unit 38 has a plurality of rod members (i.e., holding unit rod members) 381A-381C each of which is a round bar (i.e., a cylinder). The rod members 381A-381C are fixed to a supporting member 382. The holding unit 38 further includes a holding unit moving unit 383 for moving the rod members 381A-381C (see FIG. 3A)

The holding unit moving unit 383 is configured to move the rod members 381A-381C by moving the supporting member 382. Although not illustrated in detail in the drawing, the holding unit moving unit 383 further includes an arm that moves the supporting member 382 and a hydraulic unit that drives the arm.

The holding unit moving unit 383 moves the rod members 381A-381C along the Y-axis directions illustrated in FIG. 3A. An example of operation thereof will now be described in more detail.

After the sheet piece 33A has been moved onto the rod members 381A-381C, the holding unit moving unit 383 moves the rod members 381A-381C in the direction B (see FIG. 3A) to the outside of the zone above the conveyance course 331. By thus moving the rod members 381A-381C to the outside of the zone above the conveyance course 331, the sampled sheet piece 33A can be conveyed to the outside of the zone above the conveyance course 331, and can be taken down from the rod members 381A-381C.

After the holding unit moving unit 383 conveys the sampled sheet piece 33A to the outside of the zone above the conveyance course 331 and the sheet piece 33A is taken down from the rod members 381A-381C, the holding unit moving unit 383 moves the rod members 381A-381C in the direction opposite to the direction B, and places the rod members 381A-381C in the zone above the conveyance course 331 illustrated in FIGS. 3A and 3B.

The inverting unit 39 is provided on the downstream side of the holding unit 38 along the sheet piece conveyance directions.

The inverting unit 39 includes a receiving member 391 having a plurality of rod members (i.e., inverting rod members) 391A-391C, and a sending member 392 also having a plurality of rod members (i.e., inverting rod members) 392A-392C. The receiving member 391 is rotatable around a rotational axis illustrated as a broken line c in the drawing. Also the sending member 392 is rotatable around a rotational axis illustrated as a broken line c'.

The rollers 34L and 34M of the conveying unit 34 are between the rod members 391A-391C of the receiving member 391. The rollers 34N and 34O of the conveying unit 34 are between the rod members 392A-392C of the sending member 392.

In the inverting unit 39 described above, the receiving member 391 on which the sheet piece 33B is placed and the sending member 392 are rotated around the rotational axes of the broken lines c and c' in opposite directions so that the receiving member 391 and the sending member 392 face one another to have the sheet piece 33B therebetween and the sheet piece 33B is caused to come into contact with the sending member 392. Thereafter, the sending member 392 having the sheet piece 33B thus placed thereon is rotated in the same direction as that in which the receiving member 391 has been rotated. Consequently, the sending member 392 is returned to an original approximately horizontal position of before the rotation. Thus, the sheet piece 33B moves from the receiving member 391 onto the sending member 392 in an upside-down state. Also the receiving member 391 is returned to an original approximately horizontal position of before the rotation so that the receiving member 391 can receive a subsequent sheet piece.

The rod members 391A-391C and the rod members 392A-392C are flat plates, respectively.

The sheet piece that has been thus moved onto the sending member 392 is conveyed to a drier through a conveying unit, and the drier dries the sheet piece. Thereafter, the sheet piece is cut into gypsum boards each having a desired size.

The above-described gypsum building material manufacturing apparatus is used to manufacture gypsum boards in succession, and sheet pieces that are semifinished products for gypsum boards can be sampled at random timings to the entire extent desired.

Second Embodiment

A gypsum building material manufacturing apparatus 20 according to a second embodiment is different from the above-described first embodiment in that, in a downstream-side apparatus 40, the number of rollers of a conveying unit 44 provided between the cutting unit 32 and the pressing-up unit 37 is changed; a plurality of separating units 451 and 452 are provided; a speed adjusting unit 47 is provided; and rollers of the conveying unit 44 to be controlled are changed. The other configuration of the second embodiment is the same as or similar to that of the first embodiment. The gypsum building material manufacturing apparatus 20 according to the second embodiment having a similar configuration as that of the first embodiment is used to manufacture gypsum boards that are gypsum building materials, and to sample thus manufactured semifinished products for gypsum boards.

Now, the sampling apparatus and ancillaries placed on the downstream side of the shaping apparatus 22 in the gypsum building material manufacturing apparatus 20 according to the present embodiment will be described with reference to FIGS. 4A and 4B.

Figure 4A:
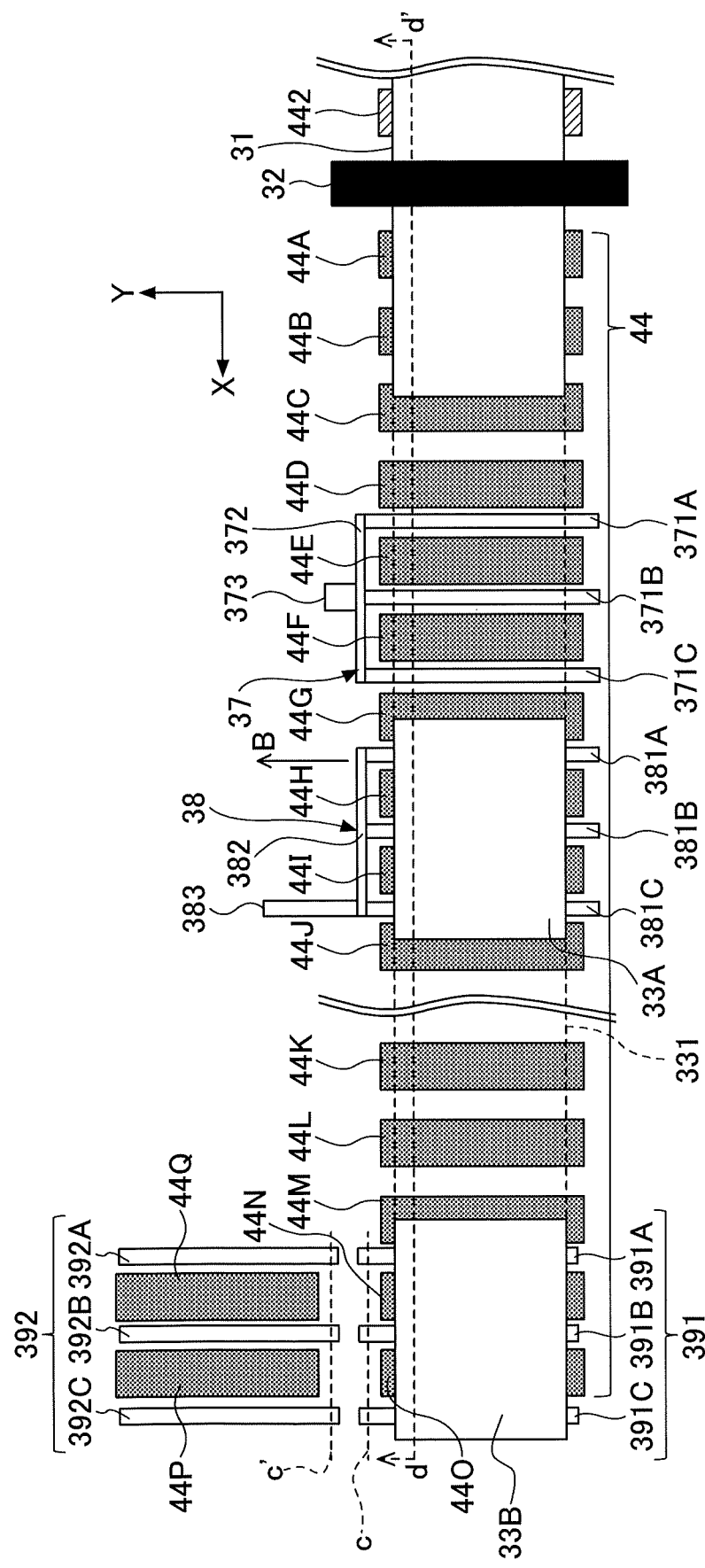
FIG. 4A illustrates a downstream-side apparatus according to a second embodiment of the present invention.

FIG. 4A is a plan view of a downstream-side apparatus 40; FIG. 4B is a schematic sectional view taken along a d-d' line of FIG. 4A. The same reference numerals are given to the same members as those of the downstream-side apparatus 30 described above for the first embodiment, and description therefor will be partially omitted.

Figure 4B:
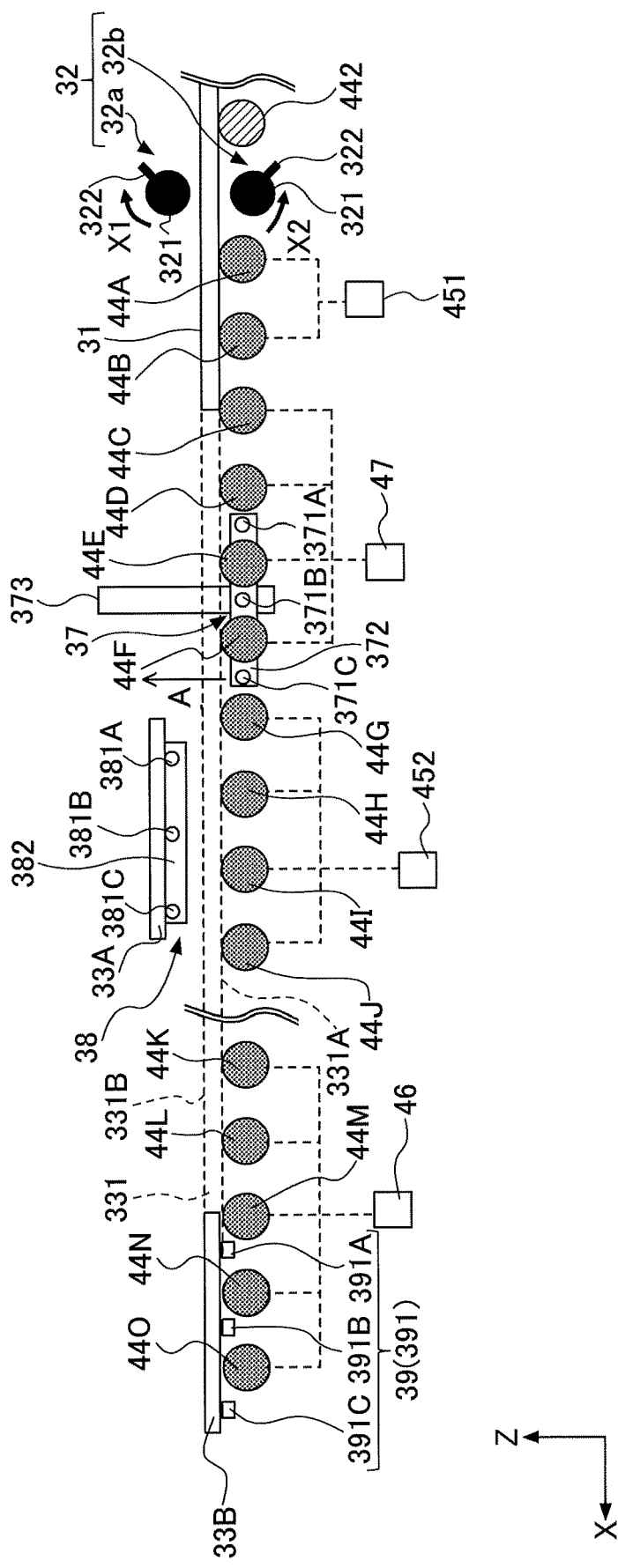
FIG. 4B illustrates the downstream-side apparatus according to the second embodiment of the present invention.

In the downstream-side apparatus 40, a strip-shaped continuous semifinished product for gypsum boards that is a sheet product 31 shaped in the already described shaping apparatus 22 is conveyed along the X-axis directions in FIGS. 4A and 4B by an upstream-side conveying unit 442 that is on the upstream side in FIGS. 4A and 4B, and is coarsely cut by the cutting unit 32.

As the cutting unit 32, a rotary cutter is used as in the first embodiment. A configuration of the rotary cutter has been described above, and therefore, description therefor will be omitted.

Sheet pieces 33A and 33B that are semifinished products for gypsum boards after being cut are conveyed along the X-axis directions by a conveying unit 44. As the conveying unit 44, a roller conveyer that includes a plurality of rollers 44A-44Q is used, as illustrated in the drawings.

The rod members 371A-371C of the pressing-up unit 37 are between rollers 44D-44G of the conveying unit 44. The holding unit 38 is placed in a zone above rollers 44G-44J of the conveying unit 44. The inverting unit 39 is placed near rollers 44M-44Q of the conveying unit 44. These units have configurations the same as or similar to those of the first embodiment except that the arrangement is changed. Therefore, description therefor will be omitted.

In order that a distance between sheet pieces 33A and 33B that are semifinished products for gypsum boards acquired through cutting is to be sufficiently long, a first separating unit 451 is provided (see FIG. 4B). According to the present embodiment, the first separating unit 451 is configured as a separating unit control unit that controls a segment of the conveying unit 44 conveying the sheet pieces 33A and 33B in such a manner that, in the segment, the conveyance speed will be higher than the conveyance speed of the upstream-side conveying unit 442 placed on the upstream side of the cutting unit 32.

In more detail, the first separating unit 451 is configured as a separating unit control unit that controls the speed at which the rollers 44A and 44B convey the sheet pieces 33A and 33B on the downstream-side of and immediately subsequent to the cutting unit 32 to be higher than the speed of conveying a sheet product by the upstream-side conveying unit 442.

By providing the first separating unit 451, it is possible to convey a sheet piece after being cut by the cutting unit 32 quickly to the downstream side, so that it is possible to secure a sufficient distance from a sheet piece that will be subsequently cut.

The downstream-side apparatus 40 further includes the pressing-up unit 37 and includes the speed adjusting unit 47 for the holding unit 38 to be able to sample a sheet piece more easily (see FIG. 4B).

According to the present embodiment, the speed adjusting unit 47 is configured as a speed adjusting unit control unit that controls the speed at which the rollers 44C-44F of the conveying unit 44 convey the sheet pieces 33A and 33B at a zone where the pressing-up unit 37 is placed and a zone immediately before it. In more detail, the speed adjusting unit 47 is configured as the speed adjusting unit control unit that controls the speed at which the rollers 44C-44F of the conveying unit 44 convey the sheet pieces 33A and 33B in such a manner that the speed at which the rollers 44C-44F of the conveying unit 44 convey the sheet pieces 33A and 33B will be lower than the speed at which the rollers 44A and 44B of the conveying unit 44 convey the sheet pieces 33A and 33B.

By providing the speed adjusting unit 47, the sheet piece 33A is previously decelerated thereby so that the sheet piece 33A can be caused to stop on the holding unit 38 more reliably, to be held by the holding unit 38, after the pressing-up unit 37 presses up the sheet piece 33A.

The second separating unit 452 is provided in order that a distance between sheet pieces that are not sampled by the pressing-up unit 37 and the holding unit 38 is to be sufficiently long (see FIG. 4B). In more detail, the second separating unit 452 is configured as a second separating unit control unit that controls the rollers 44G-44J of the conveying unit 44 that are on the downstream side of and immediately subsequent to the pressing-up unit 37 in such a manner that the speed at which the rollers 44G-44J of the conveying unit 44 convey a sheet piece will be higher than the speed at which the rollers 44C-44F of the conveying unit 44 that are immediately before the rollers 44G-44J convey a sheet piece.

By providing the second separating unit 452, it is possible to convey a sheet piece that is not sampled by the pressing-up unit 37 quickly to the downstream side to secure a sufficient distance from a sheet piece that is subsequently conveyed.

The downstream-side apparatus 40 further includes a decelerating unit 46 (see FIG. 4B) for the inverting unit 39 to be able to invert a sheet piece easily. The decelerating unit 46 is configured as a decelerating unit control unit that controls the rollers 44K-44O of the conveying unit 44 at a zone where the inverting unit 39 is placed and a zone immediately before it in such a manner that the speed at which the rollers 44K-44O of the conveying unit 44 convey the sheet piece 33B that is not sampled will be lower than the speed at which the rollers 44G-44J of the conveying unit 44 that are immediately before the rollers 44K-44O convey the sheet piece 33B.

Note that, according to the present embodiment, the decelerating unit control unit controls the speed at which the rollers 44K-44O convey a sheet piece to be lower than the speed at which the rollers 44A-44J of another segment of the conveying unit 44 convey a sheet piece.

By providing the decelerating unit 36, the sheet piece 33B can be caused to stop on the inverting unit 39 more reliably when the inverting unit 39 is to invert the sheet piece 33B.

The above-described gypsum building material manufacturing apparatus is used to manufacture gypsum boards in succession, and sheet pieces that are semifinished products for gypsum boards can be sampled at random timings to the entire extent desired.

Thus, the sampling apparatuses, the sheet member manufacturing apparatuses, and the gypsum building material manufacturing apparatuses have been described with reference to the embodiments and so forth. However, the present invention is not limited to the embodiments and so forth, and various variations and modifications can be made within the scope of the gist of the claimed invention.

The present application claims priority to Japanese Patent Application No. 2017-081565, filed on Apr. 17, 2017, the entire contents of which are hereby incorporated herein by reference.

DESCRIPTION OF REFERENCE NUMERALS

11, 34, 44 Conveying units
111, 34A-34O, 44A-44Q Rollers
12A-12C, 33A, 33B Sheet pieces
121 Conveyance course
13, 37 Pressing-up units
14, 38 Holding units
133, 373 Rod member moving units
131A-131C, 371A-371C Rod members
27 Sampling apparatus
20 Gypsum building material manufacturing apparatus
31 Sheet product
32 Cutting unit
342, 442 Upstream-side conveying units
35 Separating unit
451 First separating unit
452 Second separating unit
47 Speed adjusting unit

The invention claimed is:

1. A sampling apparatus comprising:
   a pressing-up unit configured to press up a sheet piece that is being conveyed by a conveying unit, from below a conveyance course of the sheet piece to above the conveyance course;
   a holding unit configured to hold the sheet piece pressed up by the pressing-up unit; and
   a separating unit configured to increase a distance between the sheet product and the sheet piece cut from the sheet product or a distance between sheet pieces cut from the sheet product.

2. The sampling apparatus according to claim 1, further comprising:
   a cutting unit configured to cut the sheet piece from a sheet product; and
   an upstream-side conveying unit configured to convey the sheet product and send the sheet product to the cutting unit, wherein
   the conveying unit is on a downstream side of the cutting unit along a conveyance direction of the sheet piece.

3. The sampling apparatus according to claim 2, further comprising:
   a speed adjusting unit configured to adjust a speed at which the conveying unit is conveying the sheet piece at a zone that includes at least a part of a segment of the conveying unit on an upstream side of the pressing-up unit along the conveyance direction of the sheet piece.

4. The sampling apparatus according to claim 1, wherein the conveying unit comprises a roller conveyer.

5. The sampling apparatus according to claim 4, wherein the pressing-up unit includes
   a plurality of rod members, and
   a rod member moving unit configured to move the rod members, wherein
   the rod member moving unit is configured to move the rod members between below the conveyance course and above the conveyance course, and
   for a case where the rod members are below the conveyance course, the rod members extend parallel to rollers of the roller conveyer and extend between the rollers.

6. The sampling apparatus according to claim 5, wherein a rod member at an upstream side along a conveyance direction of the sheet piece from among the rod members is a round bar.

7. A sheet member manufacturing apparatus comprising the sampling apparatus according to claim 1.

8. A gypsum building material manufacturing apparatus comprising the sampling apparatus according to claim 1.

9. The sampling apparatus according to claim 1, further comprising:
   a speed adjusting unit configured to adjust a speed at which the conveying unit is conveying the sheet piece at a zone that includes at least a part of a segment of the conveying unit on an upstream side of the pressing-up unit along the conveyance direction of the sheet piece.

* * * * *